US012117896B2

United States Patent
Meenakshisundaram et al.

(10) Patent No.: US 12,117,896 B2
(45) Date of Patent: Oct. 15, 2024

(54) STAND-ALONE IOT DEVICE FOR REPAIRING FAILURES ON A COMPUTING DEVICE

(71) Applicant: Bank of America Corporation, Charlotte, NC (US)

(72) Inventors: Meenakshi Meenakshisundaram, Chennai (IN); Nithya C, Chennai (IN); Rajaram Vijayvergiya, Hyderabad (IN); Madhumitha S, Chennai (IN); John Iruvanti, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 68 days.

(21) Appl. No.: 18/122,204

(22) Filed: Mar. 16, 2023

(65) Prior Publication Data

US 2024/0311226 A1    Sep. 19, 2024

(51) Int. Cl.
*G06F 11/00* (2006.01)
*G06F 11/07* (2006.01)

(52) U.S. Cl.
CPC ...... *G06F 11/0793* (2013.01); *G06F 11/0751* (2013.01); *G06F 11/079* (2013.01)

(58) Field of Classification Search
CPC ............. G06F 11/0793; G06F 11/0751; G06F 11/079; G06F 11/3051; G06F 11/3055; G06F 11/3058
See application file for complete search history.

(56) References Cited

U.S. PATENT DOCUMENTS

| 7,694,169 | B2 | 4/2010 | Slater et al. |
| 10,397,230 | B2 | 8/2019 | Callaghan et al. |
| 10,528,740 | B2 | 1/2020 | Callaghan et al. |
| 10,866,849 | B2 * | 12/2020 | Das ..................... G06F 11/0793 |
| 11,119,872 | B1 * | 9/2021 | Jacobson .............. G06F 11/202 |
| 2015/0261598 | A1 * | 9/2015 | Balasubramanian ....................... G06F 11/0709 714/10 |
| 2021/0133607 | A1 * | 5/2021 | Stubbs ................... G06N 20/00 |

* cited by examiner

*Primary Examiner* — Philip Guyton
(74) *Attorney, Agent, or Firm* — Weiss & Arons LLP

(57) ABSTRACT

A stand-alone embedded internet of things edge artificial intelligence device ("EIEAC") may be provided. The EIEAC may be configured to operate independent of the computing device and may be configured to monitor and repair failures occurring at the computing device. The EIEAC may receive computer health data from a client agent application running on the computing device. The EIEAC may include a memory configured to store the computer health data and a battery configured to charge the EIEAC. The EIEAC may include a processor configured to process the computer health data to identify one or more failures using tiny machine learning ("tinyML"). When one or more failures are identified by the processor, the tinyML may be configured to execute instructions on the computer health data for repairing the one or more failures. When unsuccessful, the EIEAC may establish an electronic connection with a remote cloud lookup tower for repairing.

7 Claims, 4 Drawing Sheets

STAND-ALONE IOT DEVICE FOR REPAIRING FAILURES ON A COMPUTING DEVICE

FIELD OF TECHNOLOGY

Aspects of the disclosure relate to remediating and repairing errors on computing devices leveraging an external IoT device.

BACKGROUND OF THE DISCLOSURE

Remote computer technical support over the internet is commonly used due to ease of access and affordability. When a computing device is experiencing technical difficulties, the remote support may access the computing device through the internet connection and attempt to resolve the issues. Such remote support, however, relies on an established internet connection between the computing device and the remote support website. In the event that the computer is unable to support an internet connection, access to technical support is lost.

It would be desirable, therefore, to leverage an external device that operates independent of the computing device to provide seamless technical support for the computing device that is not dependent on the computing device's internet connection.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
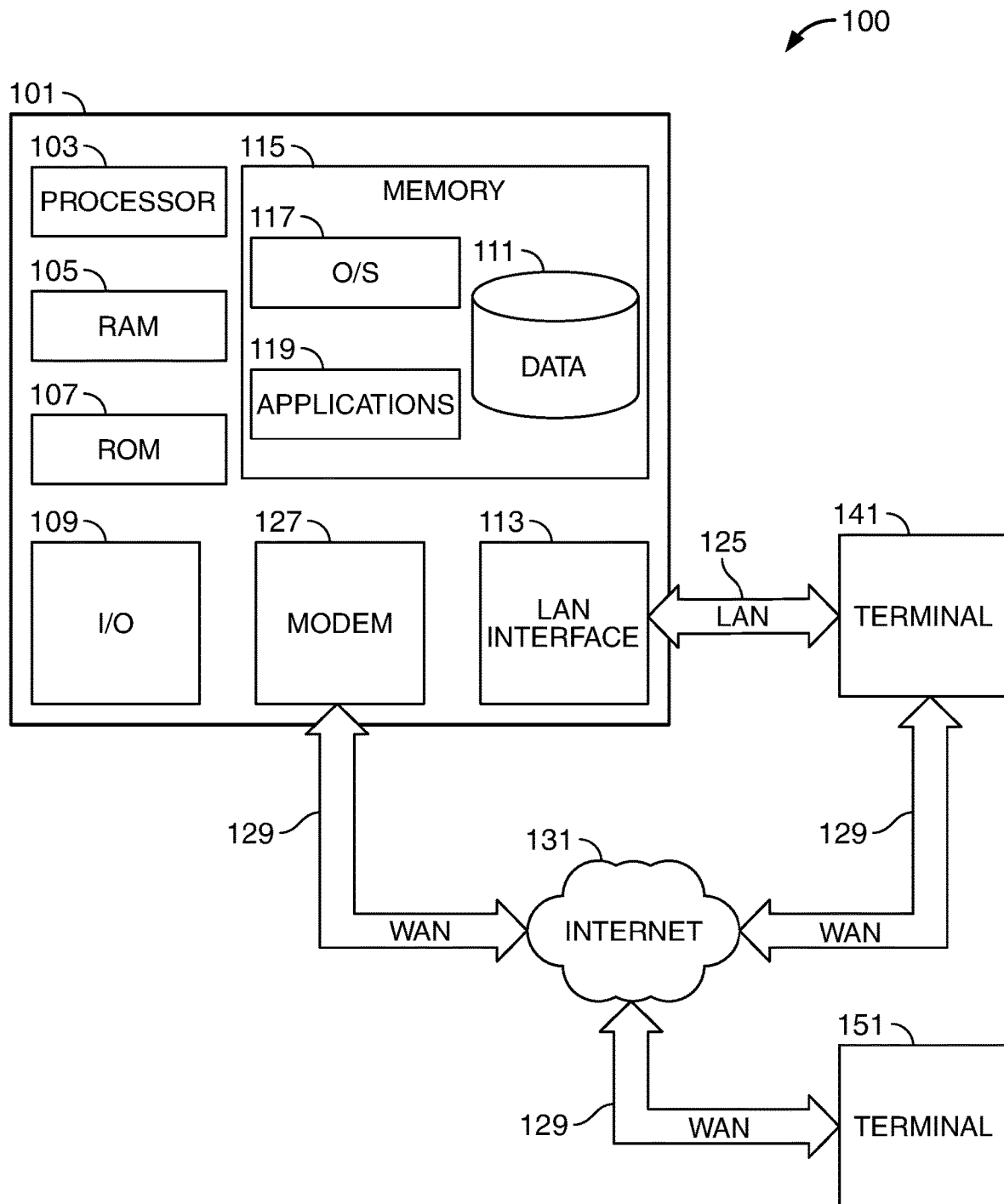
FIG. 1 shows an illustrative block diagram in accordance with principles of the disclosure.

A stand-alone embedded internet of things edge artificial intelligence device ("EIEAC") is provided. The EIEAC may be configured to operate independent of the computing device. The EIEAC, when physically coupled to a computing device, may be configured to monitor and repair failures occurring at the computing device.

The computing device may be a laptop. The computing device may be a desktop computer. The computing device may be a computing device from a plurality of computing devices. The computing device may also include a point-of-sale device. The computing device may also include a smartphone.

The EIEAC may be physically coupled to the computing device. The EIEAC may be a peripheral of the computing device. The EIEAC may be physically coupled to the computing device via one of a universal serial bus ("USB") port, serial port, parallel port, specialized network card, and/or ethernet network.

The EIEAC may be a 5G enabled internet of things ("IT") device. The EIEAC may leverage a successor to 5G cellular technology. The EIEAC may include battery power, internet connectivity and essential booting files.

The EIEAC may be enabled to communicate with the computing device using the address of the EIEAC. The processor of the computing device may place the device address on an address line. Each interface of the computing device may decode the address and a control received from any one of the I/O busses and interpret them as a peripheral and further send signals.

The computing device may be a computing device selected from a plurality of computing devices. The computing devices may be a part of a network of computing devices. Each computing device may be coupled to an EIEAC. Each EIEAC may be in electronic communication with a remote cloud lookup tower associated with the EIEAC. In some embodiments, each EIEAC may be in electronic communication with the remaining, unselected, EIEACs.

The EIEAC may include a receiver. The receiver may be configured to receive computer health data from a client agent application running on the computing device. The client agent application may be an application that crawls the computing device and monitors a health of the computer. The client agent application may gather computer health data and transmit it to the EIEAC for identifying errors and failures.

In some embodiments, the computer health data may include data that does not signify any issues associated with errors, failures and/or onset of a failure. The computer health data may be stored at the EIEAC and further transmitted to the remote cloud lookup tower for enhancing artificial intelligence ("AI") and machine learning ("ML") of the remote cloud lookup tower.

The EIEAC may also include a memory configured to store the computer health data. The memory may be a solid-state drive ("SSD"). An SSD, or solid-state drive, may be a type of storage device used in computers. The SSD may be a non-volatile storage media that may store persistent data on solid-state flash memory. With an SSD, the computing device's operating system may boot up more rapidly, programs may load quicker and files may be saved faster.

The EIEAC may further include a battery. The battery may be configured to charge the EIEAC. The EIEAC may be configured to operate when power at the computing device may not be provided.

The EIEAC may also include a processor. The processor may be configured to process the computer health data received from the client agent application. The processing may be to identify one or more failures. They processing may use tiny machine learning ("tinyML") for identifying the one or more failures.

In some embodiments, the processing may identify an onset of a failure prior to the failure occurring.

When one or more failures are identified by the processor, the tinyML may be configured to run a first set of instructions on the computer health data for repairing the one or more failures identified by the processor.

It should be appreciated that the EIEAC may store repair scripts that may be configured to repair some of the failures that may occur at a computing device. The remaining repair scripts may be stored at the remote cloud lookup tower.

The first set of instructions may include executing, via the EIEAC, a repair script at the computing device. Following the executing of the repair script, the first set of instructions may further include accessing a log file that may include a result of an execution of the repair script. The log file may be generated at the computing device. The first set of instructions may also include determining by the EIEAC, based on the log file, a success or a failure of the execution of the repair script.

When it is determined that the first set of instructions fails to repair the one or more failures, the processor may be configured to run a second set of instructions. The second set of instructions may include establishing an electronic connection between the EIEAC and the remote cloud lookup tower. Following the establishing of the electronic connection, the second set of instructions may include, transmitting to the remote cloud lookup tower the one or more failures.

The EIEAC may also include bootable files stored at the EIEAC. When an auto-boot of the computing device fails to initiate, the processor may be configured to, using tinyML, execute the bootable files to self-boot the computing device.

It should be appreciated that when the computing device loses power, the EIEAC may be configured to maintain power at the EIEAC.

It should be appreciated that in some embodiments, when the computing device loses power, the EIEAC may be configured to supply power temporarily to the computing device.

When the processor at the EIEAC is not successful to repair the one or more failures, the one or more failures may be transmitted to the remote cloud lookup tower. The remote cloud lookup tower may include a data repository of issue types and corresponding repair script files that may be enabled to repair the issue types. The repair script files may be configured for execution at the computing device for repairing the one or more failures based on the issue type.

When the remote cloud lookup tower receives the one or more failures, the remote cloud lookup tower may be configured to select the one or more repair script files stored in the data repository for execution at the EIEAC based on a type of issue associated with the one or more failures.

The computer health data may include data associated with overheating of the central processing unit ("CPU"), overheating of the graphical processing unit ("GPU") and/or a blue screen of death ("BSOD") error. The computer health data may also include data associated with registry backups, event logs, organization of files, memory, operating system ("OS") functionality, basic input/output system ("BIOS") settings and restore points.

In some embodiments, when based on the computer health data, the EIEAC may predict an onset of a failure, the EIEAC may be configured to repair the failure. Some of the failures that the EIEAC may be enabled to repair may include failures associated with overheating of the CPU, overheating of the GPU and BSOD errors.

Symptoms of overheating may include the system booting up but may shut down automatically after a short period of time and/or CPU operating frequency may be less than expected. Additional symptoms may include CPU throttling and/or general slowness of system. Excessive CPU and/or system fan noise may also be a symptom of overheating.

It should be appreciated that in some embodiments, the EIEAC may be enabled to detect the onset of the failure and execute pre-emptive measures to repair the issue prior to a complete failure and/or crash of the computing device and associated systems.

When one or more failures occur at one of the computing devices that are included in a network of computing devices, the EIEAC may transmit an electronic communication including the failure to the remote cloud lookup tower. The failure and a determination of the cause of the failure may be used for machine learning. The remote cloud lookup tower may use this data for further navigating computing system behavior and use it for failures that may occur at another computing device within the network.

It should be appreciated that in the event that internet connectivity at the computing device is not able to be established and an error occurs, the EIEAC may be enabled to establish the internet connection and repair the error and/or electronically communicate with the remote cloud lookup tower for repairing the error.

A method for monitoring and repairing failures occurring at a computing device may be provided. The method may include using an EIEAC that may be physically coupled to the computing device. The EIEAC may be configured to operate independent of the computing device.

The EIEAC may be enabled to operate independent of the computing device because the EIEAC is an IoT device with its own power, data storage, processor and internet connectivity.

The method may include receiving computer health data from a client agent application running on the computing device. The method may further include storing the computer health data within a memory at the EIEAC.

The method may also include processing the computer health data to identify one or more failures using tinyML. The processing may include identifying one or more failures. In response to the identifying, running a first set of instructions on the computer health data for repairing the one or more failures identified by the processor.

The first set of instructions may include executing, via the EIEAC, a repair script at the computing device. Following the executing of the repair script, the method may include accessing a computer-generated file. The computer-generated file may include a result of an execution of the repair script. The computer generated file may be generated at the computing device. The first set of instructions may also include determining based on the computer-generated file, a success or a failure of the executing of the repair script at the computing device.

The computer-generated file may be a log file. The computer-generated file may be a file generated in response to running a check disk ("CHKDSK") that may check the file system and the hard drive of the computing device. Details of the check disk may be displayed after the running and may include displayed errors that may have been repaired.

When, in response to determining that the first set of instructions fails to repair the one or more failures, the method may include running a second set of instructions. The second set of instructions may include establishing an electronic connection between the EIEAC and a remote cloud lookup tower. Via the electronic connection, the method may include transmitting to the remote cloud lookup tower the one or more failures.

When the one or more failures is associated with the BSOD error, the method may include triggering, via the EIEAC, an executing of the bootable files for re-booting the computing device. The re-booting may automatically repair the BSOD error.

The method may further include, simultaneous to the triggering, transmitting to the remote cloud lookup tower, data associated with the BSOD error for enhancing the AI and ML of the remote cloud lookup tower.

A self-recuperating computing system for monitoring and repairing failures occurring at a computing device may be provided. The self-recuperating computing system may leverage an IoT. The IoT may be physically coupled to the computing device.

The system may include a client agent application stored on the computing device. The client agent application may be configured to crawl the computing device and collect computer health data from the computing device.

The client agent application may be configured transmit the computer health data to an IoT embedded in the computing device.

The IoT device may be an EIEAC. The EIEAC may be configured to operate as an in-house technical support computing device for one or more failures identified in the computer health data.

The EIEAC may include a memory configured to store the computer health data.

The EIEAC may include a battery configured to charge the EIEAC.

The EIEAC may include one or more bootable files configured to initiate a booting of the computing device when an auto-boot fails to start.

The EIEAC may include a processor configured to process the computer health data to identify one or more failures using tinyML. The processor may also leverage edge AI and Tensor Lite®.

The EIEAC may include a robotic process automation ("RPA") executor. The RPA executor may be configured to execute, at the computing device, a repair script file transmitted by the remote cloud lookup tower.

The system may also include a remote cloud lookup tower. The remote cloud lookup tower may be a centralized remote technical support application. The remote cloud lookup tower may be in electronic communication with the EIEAC.

The remote cloud lookup tower may be configured to receive computer health data from the EIEAC. The remote cloud lookup tower may be configured to store the computer health data and EIEAC data within a database of the remote cloud lookup tower.

The remote cloud lookup tower may be configured to also identify failures based on the computer health data received from the EIEAC and further repair failures that the EIEAC fails to repair.

The database may also include a repairability index table ("RIT") of issue types and a corresponding repair script file for each issue type. The RIT may include issue types that may occur on a computing device and corresponding repair scripts. The remote cloud lookup tower may be configured to retrieve a repair script file based on the issue type identified in the computer health data and transmit it to the EIEAC for execution.

The RIT may also include issue types associated with a failure that may have occurred at one or more computing devices that did not have a corresponding repair script assigned in the RIT. Using ML and AI the remote cloud lookup tower may select one or more repair scripts and/or generate a new repair script for the failure. When the newly generated repair script successfully repairs the failure, the newly generated repair script may be stored in the RIT as corresponding to the failure.

For example, when an error occurs at the computing device and the RIT does not include an issue type that corresponds to the error, the remote cloud lookup tower may leverage AI and ML to determine a repair script that may be most suitable to repair the error. The repair script that successfully repairs the error may be added to the RIT as a pair. The repair script may be a newly generated repair script using a combination of existing repair scripts stored in the repository. The repair script may be a repair script that is stored as corresponding to a first issue type and determined, using the AI and ML, to be successful for a second issue type.

It should be appreciated that the newly generated repair script and/or the repair script determined to be successful for repairing a second issue type may be transmitted to the EIEAC and stored in memory at the EIEAC.

The system may also include a secure client communication tool. The secure client communication tool may be a secure channel for transferring information from the EIEAC to the cloud lookup tower and for receiving information from the cloud lookup tower to the EIEAC. The repair scripts may be transmitted to the EIEAC via the secure client communication tool. The results of the execution of the repair scripts may be transmitted from the EIEAC to the remote cloud lookup tower via the secure client communication tool.

It should be appreciated that cloud lookup tower may leverage ML to enable identification of the issue type.

The EIEAC may be configured to, when the auto-boot fails to start, execute the bootable files. The execution of the bootable files may initiate the booting through the BIOS.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows an illustrative block diagram of system 100 that includes computer 101. Computer 101 may alternatively be referred to herein as an "engine," "server" or a "computing device." The self-recuperating computing system may include one or more computer servers 101. Computer 101 may be any computing device described herein, such as the EIEAC 306 and 326, the computing device(s) 302 and 322 and remote cloud lookup tower 328. Elements of system 100, including computer 101, may be used to implement various aspects of the systems and methods disclosed herein.

Computer 101 may have a processor 103 for controlling the operation of the device and its associated components, and may include RAM 105, ROM 107, input/output circuit 109, and a non-transitory or non-volatile memory 115. Machine-readable memory may be configured to store information in machine-readable data structures. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of computer 101. Memory 115 may also store videos, text, and/or audio assistance files. The data stored in Memory 115 may also be stored in cache memory, or any other suitable memory. Memory 115 may be memory within the EIEAC(s), computing device(s) and/or memory at the remote cloud lookup tower.

Input/output ("I/O") module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

Computer 101 may be connected to other systems via a local area network (LAN) interface 113. Computer 101 may operate in a networked environment supporting connections to one or more remote computers, such as terminals 141 and 151. Terminals 141 and 151 may be personal computers or servers that include many or all of the elements described above relative to computer 101.

When used in a LAN networking environment, computer 101 is connected to LAN 125 through a LAN interface 113 or an adapter. When used in a WAN networking environment, computer 101 may include a modem 127 or other means for establishing communications over WAN 129, such as Internet 131.

In some embodiments, computer 101 may be connected to one or more other systems via a short-range communication network (not shown). In these embodiments, computer 101 may communicate with one or more other terminals 141 and 151, using a PAN such as Bluetooth®, NFC, ZigBee, or any other suitable personal area network.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application programs 119 may utilize one or more algorithms that process received executable instructions, perform power management routines or other suitable tasks. Application programs 119 may include any one or more of the applications, instructions and algorithms associated with client agent application 304 and 324, the processor at the EIEAC(s), tinyML 314, RPA executor 314, ML 336 and transfer learning 334 and any other applications described herein.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 119 may include one or more algorithms that may be used to implement features of the disclosure.

The invention may be described in the context of computer-executable instructions, such as applications 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, Blackberry™, tablet, smartphone, or any other computing system for receiving, storing, transmitting and/or displaying relevant information. Terminal 151 and/or terminal 141 may be one or more user devices. Terminals 151 and 141 may be identical to computer 101 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, and/or smart phones, multiprocessor systems, microprocessor-based systems, cloud-based systems, programmable consumer electronics, network PCs, minicomputers, mainframe computers, distributed computing environments that include any of the above systems or devices, and the like.

Figure 2:
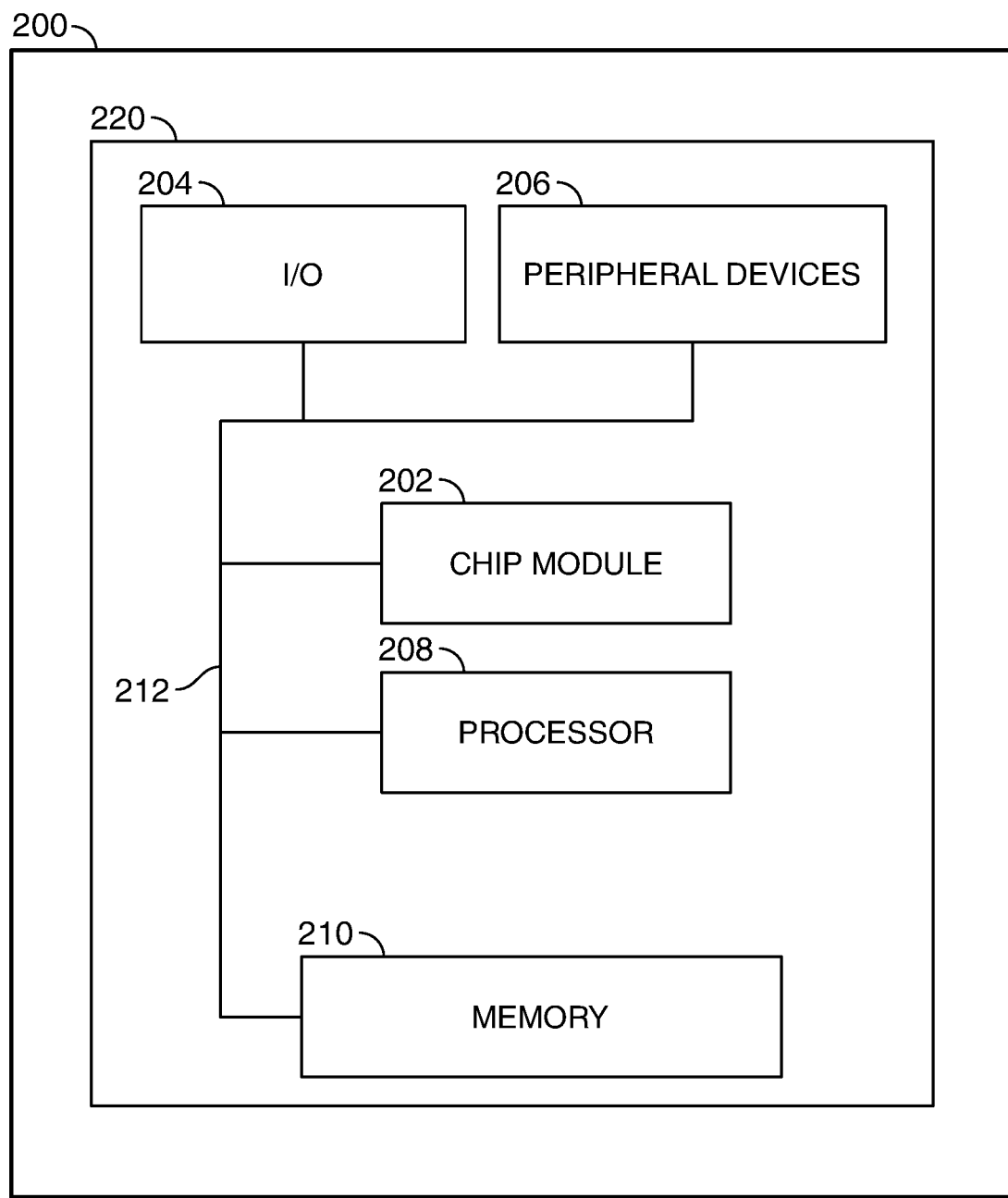
FIG. 2 shows an illustrative apparatus that may be configured in accordance with principles of the disclosure.

FIG. 2 shows illustrative apparatus 200 that may be configured in accordance with the principles of the disclosure. Apparatus 200 may be a computing device. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
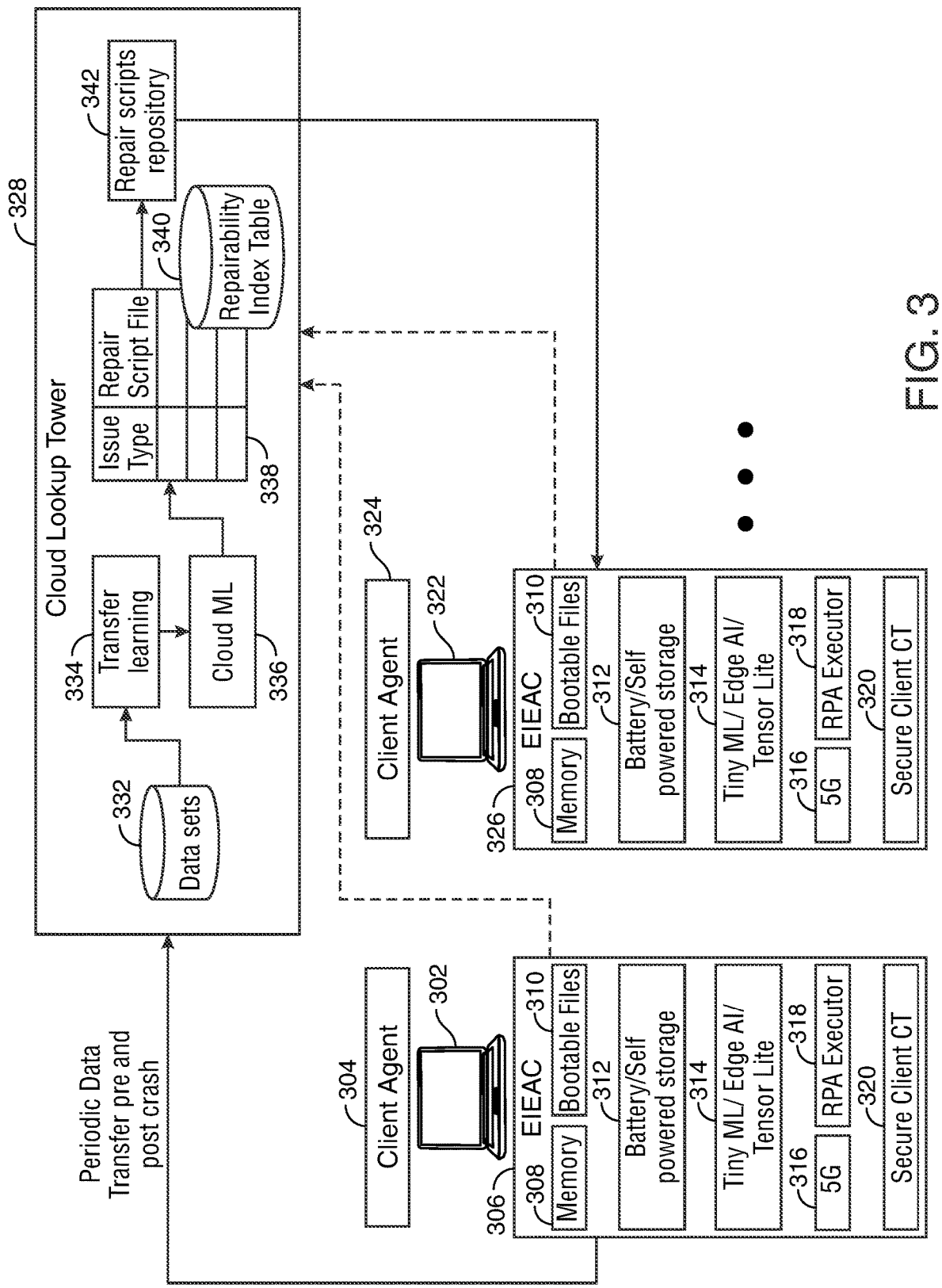
FIG. 3 shows an illustrative architecture diagram in accordance with principles of the disclosure.

FIG. 3 shows an illustrative system architecture in accordance with principles of the disclosure. The system architecture illustrated shows two computing devices, computing device 302 and computing device 322. Both computing device 302 and computing device 322 may be a part of a network of computing devices.

Computing device 302 may include an EIEAC 306 that may be physically coupled to computing device 302. EIEAC 306 may be coupled to computing device 302 via a one of a USB port, media card reader or any other suitable port.

Computing device 322 may include an EIEAC 326 that may be physically coupled to computing device 322. EIEAC 326 may be coupled to computing device 322 via one of a USB port, media card reader or any other suitable port.

It should be appreciated that both EIEAC 306 and EIEAC 326 include hardware and software embedded in the EIEACs. The hardware and software described herein including memory 308, bootable files 310, battery 312, tinyML 314, 5G 316, RPA executor 318 and secure client communication tool 320 may apply to both EIEAC 306 and EIEAC 326.

Client agent 304 may be an application running on computing device 302. Client agent 304 may be monitoring the health of computing device 302. Client agent 304 may electronically communicate with EIEAC 306. Client agent 304 may transmit the computer health data to the EIEAC 306 for analysis and for storing. The computer health data may be stored within memory 308 of the EIEAC 306.

Client agent 324 may be an application running on computing device 322. Client agent 324 may be monitoring the health of computing device 322. Client agent 324 may electronically communication with EIEAC 326. Client agent 324 may transmit the computer health data to the EIEAC 326 for analysis and for storing. The computer health data may be stored within memory 308 of EIEAC 326.

EIEAC may include 5G technology shown at 316, to enable a seamless internet provision that may enable a quicker transfer of health monitoring data and of edge AI.

Battery 312 may charge the EIEAC independent of computing device 302 and/or 322.

Bootable files 310 may be files that, upon execution, may be enabled to boot the computing device 302 when the computing device fails to boot. These bootable files may be used as an emergency start up tool and may be BIOS configured.

Processor 314 may use tinyML, Edge AI and Tensor Lite for processing the computer health data.

RPA executor 318 may be configured to execute repair scripts received from the cloud lookup tower 328.

Secure client communication tool ("CT") 320 may be a secure communication channel for transmitting and receiving data to and from the cloud lookup tower 328.

Computer health data gathered by client agent 304 may be transmitted to EIEAC 306 and stored within memory 308. Computer health data gathered by client agent 324 may be transmitted to EIEAC 326 and stored within memory 308 of EIEAC 326.

The computer health data may be periodically transferred to the remote cloud lookup tower 328 at pre-determined intervals. The computer health data may be periodically transferred when failures may not have been identified.

When a failure is identified by the processor, the computer health data is automatically transferred to the remote cloud lookup tower 328 and may not wait for the pre-determined time period of the periodic transfer.

At the remote cloud lookup tower 328, computer health data may be stored at data repository 332. Additional data associated with each of EIEAC 306 and 326 may also be stored at data repository 332.

Transfer learning 334 and ML 336 may be applied to the computer health data. Transfer learning 334 and ML 336 may be initiated to learn from existing failures and repair scripts executed to repair the failures.

Cloud lookup tower 328 may feed historical repair scripts and outcomes to cloud ML 336 and transfer learning 334. Based on the data, cloud ML and transfer learning may modify the index table to represent more robust and targeted solutions.

Each issue type and a pointer to a corresponding repair script file may be included in table 338. Table 338 may be stored in repairability index table 340 for retrieval. The repair script files may be stored in a repair script repository 342. Cloud lookup tower 328 may identify the appropriate script file and retrieve it from repair script repository 342. The repair script file may then be transmitted via the secure client communication tunnel 320 to the EIEAC for execution. The RPA executor 318 at EIEAC 306 may be configured to execute the repair script transmitted from the cloud lookup tower 328.

When a failure is determined and the corresponding repair script executed is not successful, transfer learning ML 336 may modify the repair scripts and store the modified repair scripts at repair script repository 342.

Figure 4:
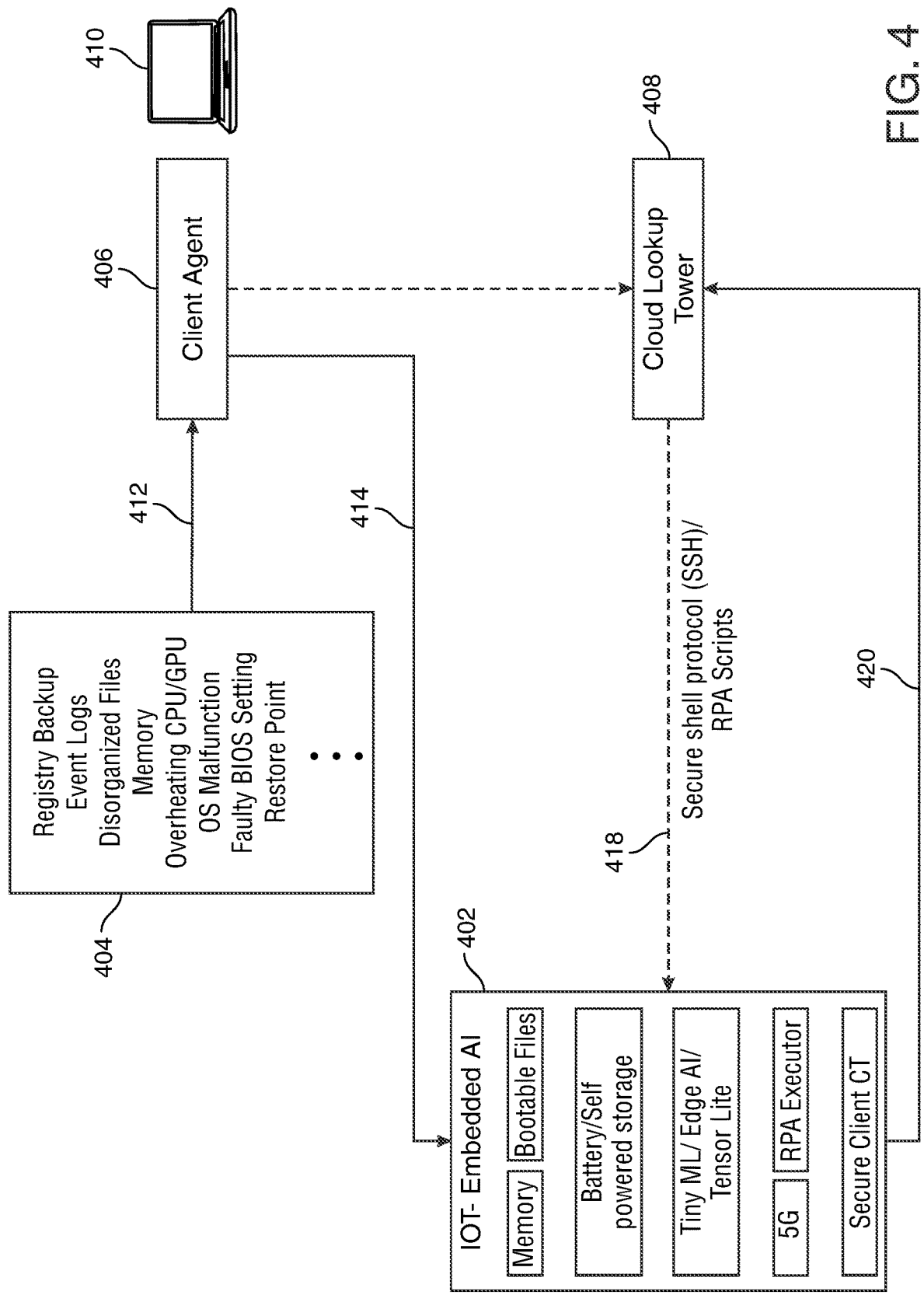
FIG. 4 shows an illustrative flow diagram in accordance with principles of the disclosure.

FIG. 4 shows an illustrative flow diagram in accordance with principles of the disclosure. Client agent application 406 may be running on computing device 410. Client agent application 406 may be configured to gather and retrieve computer health data 404, as shown at 412. The computer health data may include but may not be limited to the computer health data described at 404.

Computer health data illustrated at 404 may include data associated with registry backups. Computer health data 404 may include data associated with event logs and disorganized files. Computer health data 404 may include data associated with memory, overheating of the CPU/GPU and OS malfunction. Computer health data may include data associated with a faulty BIOS setting and restore points.

Client agent application may be in electronic communication with EIEAC 402, as shown at 414.

Client agent application may be in electronic communication with cloud lookup tower 408.

It should be appreciated that in some embodiments, client agent 406 may transmit computer health data to both EIEAC 402 and cloud lookup tower 408. In some embodiments, client agent 406 may transmit computer health data to EIEAC 402 and EIEAC 402 may transmit the computer health data to cloud lookup tower 408, as shown at 420.

Secure shell protocol ("SSH") 418 may be leveraged for electronic communication and sharing of data between cloud lookup tower 408 and EIEAC 402.

Thus, systems and methods for a stand-alone EIEAC being configured to monitor and repair failures occurring at the computing device is provided. Persons skilled in the art will appreciate that the present invention can be practiced by other than the described embodiments, which are presented for purposes of illustration rather than of limitation.

What is claimed is:

1. A self-recuperating computing system for monitoring and repairing failures occurring at a computing device, the self-recuperating computing system leveraging an internet of things ("IoT") device, the IoT device being physically coupled to the computing device, the system comprising:
 a client agent application stored on a computing device, the client agent application configured to:
  crawl the computing device and collect computer health data from the computing device; and
  transmit the computer health data to an internet of things ("IoT") device embedded in the computing device;
 the IoT device being an embedded IoT edge artificial intelligence component ("EIEAC"), the EIEAC operating as an in-house technical support device for one or more failures identified in the computer health data, the EIEAC comprising:
  a memory configured to store the computer health data;
  a battery configured to charge the EIEAC;
  one or more bootable files configured to initiate a booting of the computing device when an auto-boot fails to start;
  a processor configured to process the computer health data to identify one or more failures using tiny machine learning ("tinyML"); and
  a robotic process automation ("RPA") executor configured to execute, at the computing device, a repair script file transmitted by a remote cloud lookup tower to the EIEAC;
 a remote cloud lookup tower being a centralized remote technical support application, the remote cloud lookup tower in electronic communication with the EIEAC, the remote cloud lookup tower configured to identify failures based on the computer health data and further repair failures that the EIEAC fails to repair, the remote cloud lookup tower comprising:
  a database configured to store the computer health data and EIEAC data; and
  the database comprising a repairability index table ("RIT") of issue types and a corresponding repair script file for each issue type;
 the remote cloud lookup tower configured to retrieve a repair script file based on the issue type identified in the computer health data and transmit it to the EIEAC for execution; and
 a secure client communication tool being a secure channel for transferring information from the EIEAC to the remote cloud lookup tower and for receiving information from the remote cloud lookup tower to the EIEAC.

2. The system of claim 1 wherein the EIEAC is a 5G IoT device.

3. The system of claim 1 wherein the computer health data comprises data associated with one or more of a registry backup, event logs, disorganized files, memory, heating of a central processing unit ("CPU") and a graphical processing unit ("GPU"), operating system ("OS") functionality, basic input/output system ("BIOS") settings and restore points.

4. The system of claim 3 wherein when, based on the computer health data, the EIEAC predicts an onset of a failure, the failure comprising one of an overheating of the CPU, overheating of the GPU, a blue screen of death, the EIEAC is configured to repair the failure.

5. The system of claim 3 wherein when, based on the computer health data the EIEAC predicts an onset of a failure that the EIEAC is not able to repair, the EIEAC transmits an electronic communication comprising an identification of the failure to the remote cloud lookup tower for repair.

6. The system of claim 1 wherein the remote cloud lookup tower leverages machine learning ("ML") to enable identification of the issue type.

7. The system of claim 1 wherein the EIEAC is configured to, when the auto-boot fails to start, execute the bootable files, the executing of the bootable files initiating the booting through a basic input/output system ("BIOS").

* * * * *